(12) United States Patent
Tanaka

(10) Patent No.: US 10,604,100 B2
(45) Date of Patent: Mar. 31, 2020

(54) ARRANGEMENT FOR MOUNTING OCCUPANT PROTECTION DEVICE

(71) Applicant: MAZDA MOTOR CORPORATION, Hiroshima (JP)

(72) Inventor: Kazuhiro Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 183 days.

(21) Appl. No.: 15/541,804

(22) PCT Filed: May 25, 2016

(86) PCT No.: PCT/JP2016/002531
§ 371 (c)(1),
(2) Date: Jul. 6, 2017

(87) PCT Pub. No.: WO2016/194341
PCT Pub. Date: Dec. 8, 2016

(65) Prior Publication Data
US 2018/0001857 A1     Jan. 4, 2018

(30) Foreign Application Priority Data

Jun. 3, 2015   (JP) .................................. 2015-113315

(51) Int. Cl.
*B60R 21/206*     (2011.01)
*B62D 1/187*     (2006.01)
(Continued)

(52) U.S. Cl.
CPC ........ *B60R 21/206* (2013.01); *B60R 21/2176* (2013.01); *B62D 1/187* (2013.01); *B60R 2021/0051* (2013.01); *B62D 5/0409* (2013.01)

(58) Field of Classification Search
CPC .............. B60R 21/206; B60R 21/2176; B60R 2021/0051; B62D 1/187; B62D 5/0409
See application file for complete search history.

(56) References Cited

U.S. PATENT DOCUMENTS

| 5,507,521 | A | * | 4/1996 | Steffens, Jr. | .......... | B60R 21/203 |
| | | | | | | 180/282 |
| 7,578,519 | B2 | * | 8/2009 | Sakakida | .............. | B60R 21/206 |
| | | | | | | 280/728.3 |

(Continued)

FOREIGN PATENT DOCUMENTS

| CN | 1772536 A | 5/2006 |
| CN | 102245442 A | 11/2011 |

(Continued)

OTHER PUBLICATIONS

International Search Report issued in PCT/JP2016/002531; dated Jul. 5, 2016.

*Primary Examiner* — Paul N Dickson
*Assistant Examiner* — Timothy Wilhelm
(74) *Attorney, Agent, or Firm* — Studebaker & Brackett PC

(57) ABSTRACT

Disclosed herein is a structure for mounting an occupant protection system in a vehicle. The structure includes an electric power steering device (1) and a knee protection air bag assembly (51). The device (1) includes a steering column (18). The assembly (51) includes a bag (53) configured to expand to protect knees (9a) of an occupant (9) seated on a driver's seat (8) of the vehicle. The steering column (18) includes a drive member (26) of the device (1). The assembly (51) is located below the drive member (26).

17 Claims, 6 Drawing Sheets

FRONT OF VEHICLE ⟵     ⟶ REAR OF VEHICLE

(51) Int. Cl.
  *B60R 21/217* (2011.01)
  *B60R 21/00* (2006.01)
  *B62D 5/04* (2006.01)

(56) References Cited

U.S. PATENT DOCUMENTS

| | | | | |
|---|---|---|---|---|
| 7,722,076 | B2* | 5/2010 | Fukawatase | B60R 21/2032 |
| | | | | 280/730.1 |
| 7,753,403 | B2* | 7/2010 | Fukawatase | B60R 21/2032 |
| | | | | 280/730.1 |
| 7,938,442 | B2* | 5/2011 | Matsuo | B60R 21/2032 |
| | | | | 280/728.3 |
| 8,056,922 | B2* | 11/2011 | Mitsuo | B60R 21/2032 |
| | | | | 280/728.2 |
| 8,056,925 | B2* | 11/2011 | Fukawatase | B60R 21/2032 |
| | | | | 280/731 |
| 8,128,122 | B2* | 3/2012 | Fukawatase | B60R 21/203 |
| | | | | 280/730.1 |
| 8,220,828 | B2* | 7/2012 | Fukawatase | B60R 21/203 |
| | | | | 280/730.1 |
| 8,336,669 | B2* | 12/2012 | Yamada | B60R 21/045 |
| | | | | 180/443 |
| 8,840,142 | B2* | 9/2014 | Fujiwara | B60R 21/045 |
| | | | | 280/748 |
| 9,902,359 | B2* | 2/2018 | Takeshita | B60R 21/203 |
| 2006/0108780 | A1 | 5/2006 | Hotta et al. | |
| 2008/0217890 | A1* | 9/2008 | Fukawatase | B60R 21/2032 |
| | | | | 280/731 |
| 2011/0006506 | A1 | 1/2011 | Fukawatase et al. | |

FOREIGN PATENT DOCUMENTS

| | | | |
|---|---|---|---|
| JP | 2002-337650 A | | 11/2002 |
| JP | 2004-352012 A | | 12/2004 |
| JP | 2008-013148 A | | 1/2008 |
| JP | 2009-241621 A | | 10/2009 |
| JP | 2011-046318 A | | 3/2011 |
| JP | 2011-207419 A | | 10/2011 |
| JP | 2013-144497 A | | 7/2013 |
| JP | 5793202 B2 | | 10/2015 |
| JP | 2008013148 A | * 1/2018 | .......... B60R 21/203 |
| WO | 2013/099669 A1 | | 7/2013 |

* cited by examiner

FRONT OF VEHICLE ← → REAR OF VEHICLE

REAR OF VEHICLE ⟵                    ⟶ FRONT OF VEHICLE

ARRANGEMENT FOR MOUNTING OCCUPANT PROTECTION DEVICE

TECHNICAL FIELD

The present invention relates to a structure for mounting an occupant protection system including a knee protection air bag assembly. The air bag assembly protects the knees of the occupant seated on the driver's seat of a vehicle, if the vehicle collides with an obstacle.

BACKGROUND ART

In a known knee protection air bag assembly, a bag expands to protect the knees of the occupant seated on the driver's seat of a vehicle, if the vehicle collides with an obstacle. Such a knee protection air bag assembly is often provided near an opening of a lower panel of a dashboard so that a bag expands from the opening, or inside a column cover so that the bag expands from an opening of the column cover.

Assume that a knee protection air bag assembly is provided so that a bag expands from an opening of a lower panel of the dashboard, as described above. In order to withstand reaction force in the expansion of the bag, the air bag assembly needs to be supported by a high-strength member such as a steering member, a center stay, and a vehicle body (particularly a dash panel). Such a high-strength member is spaced apart from the position of the air bag assembly. The air bag assembly needs to be attached to a long mount portion of the high-strength member. This may cause a problem in the layout of the mount portion, and increase the weight of the vehicle body.

On the other hand, assume that a knee protection air bag assembly is provided inside a column cover. The air bag assembly is fixed to a steering column There is no need to provide a long mount portion of the air bag assembly, which leads to reductions in the size and weight of the air bag assembly. However, if a weight of an object is supported at a portion of the steering column near a steering wheel, the vibration performance of the steering wheel would deteriorate.

To address this problem, Patent Document 1 discloses a knee protection air bag assembly, which is provided below a steering column so that a bag expands from an opening of a lower panel of the dashboard. The air bag assembly is attached to a part of the steering column apart from a steering wheel (specifically at a front end part of the steering column in the vehicle). This configuration reduces the risk of deterioration in the vibration performance of the steering wheel, and the size and weight of the air bag assembly.

CITATION LIST

Patent Document

PATENT DOCUMENT 1: Japanese Unexamined Patent Publication No. 2008-13148

SUMMARY OF THE INVENTION

Technical Problem

Drive members of an electric power steering device (e.g., a drive motor and a drive gear connected to the motor shaft of the drive motor) are usually provided on the bottom of a portion of a steering column, which is closer to the front of a vehicle. These drive members are at substantially the same height as the knees of an occupant. If a knee protection air bag assembly is provided below the steering column as in the Patent Document 1, the positional relationship between the air bag assembly and the drive members is an issue. For example, if the air bag assembly is located closer to the rear of the vehicle than the drive members (i.e., if the air bag is closer to the occupant), it is difficult to keep a long distance between the air bag assembly and the knees of the occupant, and between the air bag assembly and the drive members. Thus, if the vehicle collides with an obstacle and the knees of the occupant move together with the expanding bag toward the front of the vehicle, the knees immediately abut on the air bag assembly via a lower panel of the dashboard. At this time, the drive member prevents the air bag assembly from moving toward the front of the vehicle. As a result, the drive member and the air bag assembly hinder the movement of the knees.

The present invention was made in view of this problem. It is an objective of the present invention to provide a knee protection air bag assembly in an appropriate position not to hinder the movement of the knees of an occupant together with an expanding bag toward a front of the vehicle if the vehicle collides with an obstacle.

Solution to the Problem

In order to achieve the objective, the present invention provides a structure for mounting an occupant protection system in a vehicle. The structure includes an electric power steering device including a steering column supporting a steering wheel of the vehicle, the steering column attached to a steering member; and a knee protection air bag assembly including a bag configured to expand if the vehicle collides with an obstacle to protect knees of an occupant seated on a driver's seat of the vehicle. The steering column includes a drive member of the electric power steering device. The knee protection air bag assembly is located below the drive member.

In this configuration, the knee protection air bag assembly is located below the drive member. This keeps the drive member and the air bag assembly away from the knees of the occupant (in the vehicle longitudinal direction). Thus, even if the vehicle collides with the obstacle and the knees of the occupant move together with the expanding bag toward the front of the vehicle, the drive member and the knee protection air bag assembly do not hinder the movement of the knees as much as possible.

In one preferred embodiment, in the structure described above, the knee protection air bag assembly is attached to the drive member.

In this configuration, the air bag assembly is attached to the drive member, which is located near the air bag assembly. There is thus no need to provide a long mount portion of the air bag assembly, which leads to a small and light air bag assembly. The drive member is usually provided at the front end of the steering column, which reduces negative effects of a heavy load such as the drive member and the air bag assembly on the vibration performance of the steering wheel.

The drive member is supported by the steering column with high supportability. Thus, even if the air bag assembly is attached to the drive member, the air bag assembly withstands reaction force in the expansion of the bag.

In the case where the air bag assembly is attached to the drive member, as described above, one preferred embodiment follows. The steering column includes a tilt mechanism configured to control a vertical position of the steering wheel. A lower panel of a dashboard of the vehicle is located closer to a rear of the vehicle than the knee protection air bag assembly. The knee protection air bag assembly is configured such that the bag expands through a region under a lower end of the lower panel beyond the lower panel toward the rear of the vehicle, if the vehicle collides with the obstacle.

If the steering column includes the tilt mechanism, the tilt mechanism allows the steering column to rock about a tilt spindle. This rocking changes the vertical position of the air bag assembly. On the other hand, if the air bag assembly is configured such that the bag expands from an opening of the lower panel of the dashboard, there is a matching problem between the part of the air bag assembly, from which the bag expands, and the opening of the lower panel. This is because the tilt mechanism changes the vertical position of the air bag assembly. By contrast, if the air bag assembly is configured such that the bag expands through the region under the lower end of the lower panel beyond the lower panel toward the rear of the vehicle, a change in the vertical position of the air bag assembly does not cause such matching problem. The simple configuration allows the bag to expand in front of the knees of the occupant.

In the case where the air bag assembly is attached to the drive member, as described above, another preferred embodiment follows. The steering column includes a front mount portion and a rear mount portion. The front and rear mount portions are attached to the steering member, and spaced apart from each other in a vehicle longitudinal direction. The drive member is located between the front and rear mount portions in the vehicle longitudinal direction.

Accordingly, a heavy load such as the drive member and the air bag assembly is located between the front and rear mount portions in the vehicle longitudinal direction. The center of gravity of the whole steering column is located between the front and rear mount portions in the vehicle longitudinal direction. This results in improvement in the supportability of the drive member and the air bag assembly, and reduction in negative effects of the heavy load such as the drive member and the air bag assembly on the vibration performance of the steering wheel.

In the case where the drive member is located as described above, one preferred embodiment follows. The steering member is a pipe member extending in the vehicle width direction. The drive member is located below the pipe member. The pipe member, the drive member, and the knee protection air bag assembly are arranged vertically in parallel.

In this configuration, the center of gravity of the whole steering column is located between the front and rear mount portions below the pipe member. This results in further improvement in the supportability of the drive member and the air bag assembly, and further reduction in negative effects of the heavy load such as the drive member and the air bag assembly on the vibration performance of the steering wheel.

In one preferred embodiment of the structure described above, the drive member includes a drive motor including a motor shaft projecting beyond a motor case in the vehicle width direction, and a drive gear connected to the motor shaft of the drive motor. The motor case of the drive motor has a larger diameter than the drive gear. The knee protection air bag assembly further includes an inflator extending in the vehicle width direction, and configured to feed gas to the bag, and a housing extending in the vehicle width direction, and housing the inflator and the bag. The housing is located below the motor case and the drive gear. The inflator is closer to the drive gear in the vehicle width direction in the housing.

In this configuration, the air bag assembly is close to the drive member. As a result, the steering column including the air bag assembly needs to have only a short entire vertical length.

In the case where the inflator is closer to the drive gear in the vehicle width direction in the housing, one preferred embodiment follows. A recess is formed in an upper portion the housing closer to the motor case in the vehicle width direction. The motor case is housed in the recess.

With this configuration, the air bag assembly is further closer to the drive member, and the vertical length of the whole steering column including the air bag assembly can be further reduced.

Advantages of the Invention

As described above, in the structure for mounting the occupant protection system according to the present invention, the air bag assembly is located below the drive member, which is provided in the steering column of the electric power steering device. This keeps the drive member and the air bag assembly away from the knees of the occupant (in the vehicle longitudinal direction). Thus, even if the vehicle collides with the obstacle and the knees of the occupant move together with the expanding bag toward the front of the vehicle, the drive member and the air bag assembly do not hinder the movement of the knees as much as possible.

DESCRIPTION OF EMBODIMENTS

Figure 1:
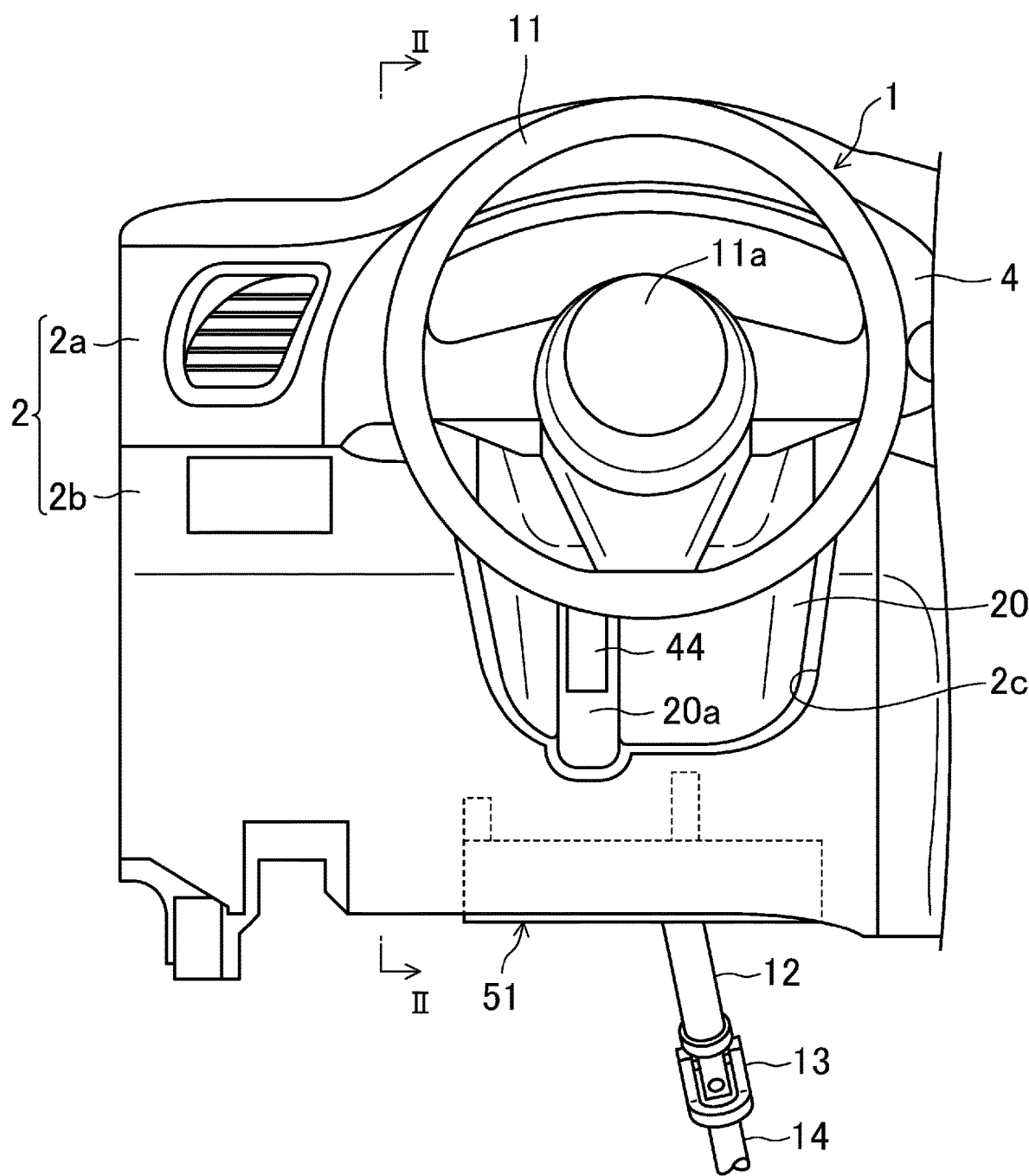
FIG. 1 illustrates a dashboard, an electric power steering device, and a knee protection air bag assembly for a vehicle including a structure for mounting an occupant protection system according to a first embodiment of the present invention as viewed from the rear of the vehicle.

Embodiments of the present invention will now be described in detail with reference to the drawings.

First Embodiment

FIGS. 1 to 4 illustrate an electric power steering device 1 and a knee protection air bag assembly (i.e., an occupant protection system) 51 for a vehicle including a structure for mounting an occupant protection system according to a first embodiment of the present invention. The electric power steering device 1 is provided on the left of a dashboard 2 in the vehicle. That is, the vehicle in this embodiment is a left hand drive vehicle.

Main components of the dashboard 2 are an upper panel 2a and a lower panel 2b under the upper panel 2a. An opening 2c is formed in the lower panel 2b at the boundary with the upper panel 2a. A steering column 18 of the electric power steering device 1, which will be described later, is inserted into the opening 2c. A meter cover 4 covering the rear of a meter 3 is provided in the upper panel 2a above the opening 2c.

In the dashboard 2, a steering member 6 (also referred to as a dashboard reinforcement member) is provided, which is a pipe member extending in the vehicle width direction. The upper end of a vertically extending center stay 7 is connected and fixed to a central portion of this steering member 6 in the vehicle width direction (see FIG. 3). The lower end of this center stay 7 is fixed to a floor tunnel (not shown), which is formed in a central portion of a floor panel of the vehicle in the vehicle width direction.

The electric power steering device 1 includes a steering wheel 11, a steering shaft 12, and an intermediate shaft 14. The steering wheel 11 is rotated and steered by an occupant (driver) seated on a driver's seat 8 of the vehicle (see FIG. 2). The rear end of the steering shaft 12 in the vehicle is connected to the center of the steering wheel 11. The end of the intermediate shaft 14, which is closer to the rear of the vehicle, is connected to the end of the steering shaft 12, which is closer to the front of the vehicle, via a universal joint 13. Although not shown, the electric power steering device 1 further includes a pinion shaft and a rack shaft. One end of the pinion shaft is connected to the end of the intermediate shaft 14, which is closer to the front of the vehicle, via a universal joint. A pinion is provided at the other end of the pinion shaft. The rack shaft includes a rack meshing with the pinion of the pinion shaft. This rack shaft extends in the vehicle width direction and is supported movably in the vehicle width direction. Ends of the rack shaft are connected to right and left steering wheels (i.e., front wheels) each via a tie rod and a knuckle arm.

The electric power steering device 1 further includes a steering column 18, which supports the steering wheel 11. This steering column 18 includes the steering shaft 12, and a column tube 19. The column tube 19 covers the steering shaft 12, and is attached to and supported by the steering member 6 as described later. The column tube 19 includes a front part 19a closer to the front of the vehicle, and a rear part 19b, which is closer to the rear of the vehicle and has a larger diameter than the front part 19a. The part of the rear part 19b, which is closer to the front of the vehicle, is externally fitted in the part of the front part 19a, which is closer to the rear of the vehicle. The rear part 19b is movable with respect to the front part 19a along the axial center of the column tube 19 (i.e., the axial center of the steering shaft 12). The rear part 19b is biased by a spring 21 with respect to a second bracket 32, which will be described later, (i.e., the front part 19a) toward the rear of the vehicle along the axial center of the column tube 19.

The steering column 18 (i.e., the steering shaft 12 and the column tube 19) extends in the vehicle longitudinal direction to be inclined upward toward the rear of the vehicle. The tilt angle of this steering column 18 with respect to the horizontal direction is adjustable by a tilt mechanism 41, which will be described later. The steering column 18 is inserted into the opening 2c of the lower panel 2b of the dashboard 2 to extend toward the rear of the vehicle beyond the dashboard 2. The steering shaft 12 is rotatably supported by the column tube 19 (i.e., the front and rear parts 19a and 19b) via a bearing (not shown). The steering shaft 12 projects toward the rear of the vehicle beyond the rear part 19b of the column tube 19 so that the steering wheel 11 is attached to the end of the steering shaft 12, which is closer to the rear of the vehicle. As a result, the steering wheel 11 is supported by the steering column 18. The steering shaft 12 extends toward the front of the vehicle beyond the front part 19a of the column tube 19 so that the end of the steering shaft 12, which is closer to the front of the vehicle, is connected to the intermediate shaft 14 via the universal joint 13.

The part of the steering column 18, which is closer to the rear of the vehicle (the part of the rear part 19b of the column tube 19 projecting toward the rear of the vehicle beyond the dashboard 2 and the periphery of the part closer to the front of the vehicle), is covered by a column cover 20 made of resin. This column cover 20 is fixed to the rear part 19b of the column tube 19.

A pad 11a at the center of the steering wheel 11 includes a known upper body protection air bag assembly (not shown) to protect the upper body (e.g., the head and breast) of the occupant 9. This upper body protection air bag assembly includes a bag configured to expand in front of the upper body of the occupant 9 if the vehicle (particularly, the front of the vehicle) collides with an obstacle. This expansion of the bag protects the upper body of the occupant 9.

A substantially ring-shaped wheel housing member 22 is fixed to the end of the front part 19a of the column tube 19, which is closer to the front of the vehicle. A drive motor 24 for steering assistance is fixed to the wheel housing member 22 via a tubular worm housing member 23. This drive motor 24 is located on one side of the steering column 18 in the vehicle width direction (on the left of the vehicle in this embodiment). A motor shaft 24b (see FIGS. 3 and 4) projects and extends from a motor case 24a toward the other side in the vehicle width direction (on the right of the vehicle in this embodiment). The drive motor 24 is provided at the steering column 18 via the wheel housing member 22 and the worm housing member 23. A worm 25 (see FIGS. 3 and 4) as a drive gear is connected to the motor shaft 24b of the drive motor 24 to rotate together with the motor shaft 24b. This worm 25 is housed in the worm housing member 23. The worm housing member 23 and worm 25 extend in the vehicle width direction. The worm housing member 23 is aligned with the motor case 24a in the vehicle width direction. The motor case 24a of the drive motor 24 has a larger diameter than the worm 25 and the worm housing member 23. In this embodiment, the drive motor 24, the worm 25, and the worm housing member 23 form a drive member 26 of the electric power steering device 1. The drive member 26 is located on the bottom of a portion of the steering column 18, which is closer to the front of the vehicle.

The wheel housing member 22 houses a worm wheel 27 (see FIGS. 3 and 4), which meshes with the worm 25 and is connected to the steering shaft 12. The worm 25 and the worm wheel 27 transmit the power of the drive motor 24 at a reduced speed to the steering shaft 12. In this manner, the drive motor 24 assists steering force of the steering wheel 11.

The steering column 18 is attached to the steering member 6. Specifically, a first bracket 31 is welded and fixed to the steering member 6 (i.e., the pipe member). The steering column 18 is fixed to two portions of the first bracket 31, which are spaced apart from each other in the vehicle longitudinal direction, via second and third brackets 32 and 33. The second bracket 32 is fixed to the portion of the first bracket 31, which is closer to the rear of the vehicle, via a fastening member (e.g., a stud bolt 35 and a nut 36). The third bracket 33 is fixed to the portion of the first bracket 31, which is closer to the front of the vehicle, via fastening member (e.g., a stud bolt 37 and a nut 38). The second and third brackets 32 and 33 correspond to the rear and front mount portions, respectively, which are apart from each other in the vehicle longitudinal direction.

The drive member 26 (i.e., the drive motor 24, the worm 25, and the worm housing member 23) is located between the second and third brackets 32 and 33 (i.e., the front and rear mount portions) in the vehicle longitudinal direction. In addition, the drive member 26 is located below the steering member 6 (i.e., the pipe member).

In this embodiment, the steering column 18 includes the tilt mechanism 41 to control the vertical position of the steering wheel 11 (i.e., the tilt angle of the steering column 18 from the horizontal plane). Specifically, the third bracket 33 includes a first portion 33a and a second portion 33b. The first portion 33a is fixed to the first bracket 31. The second portion 33b is fixed to the wheel housing member 22 and extends from the wheel housing member 22 toward the front of the vehicle. The first and second portions 33a and 33b are connected together to be rotatable about a turning shaft 43, which extends in the vehicle width direction. As a result, the steering column 18 is supported by the steering member 6 to be movable (or rockable) about the turning shaft 43. This movement about the turning shaft 43 makes the steering column 18 and the steering wheel 11 vertically movable and capable of controlling the tilt. The turning shaft 43 is a tilt spindle, which is close to the steering member 6 and closer to the front of the vehicle than the steering member 6 in this embodiment.

The steering column 18 (specifically, the rear part 19b of the column tube 19) is connected to the second bracket 32 to be vertically slidable when controlling the tilt. The steering column 18 includes a control lever 44 for fixing and releasing the column tube 19 to and from the second bracket 32. This control lever 44 is supported movably about the axis of a support shaft 45, which is provided at the second bracket 32 and extends in the vehicle width direction. The control lever 44 extends from a portion of the support shaft 45 on one side in the vehicle width direction (on the left in this embodiment) through a recess 20a in the lower surface of the column cover 20 beyond the dashboard 2 toward the rear of the vehicle. The occupant 9 vertically operates the end of the control lever 44, which is closer to the rear of the vehicle. The occupant 9 pushes down this end of the control lever 44 to turn the control lever 44 clockwise about the axis of the support shaft 45 in FIG. 2. This allows the column tube 19 (i.e., the rear part 19b) to slide vertically with respect to the second bracket 32, thereby controlling the tilt of the steering wheel 11. At this time, in this embodiment, the rear part 19b is movable with respect to the second bracket 32 (i.e., the front part 19a) along the axis of the column tube 19, thereby controlling the position of the steering wheel 11 in the vehicle longitudinal direction. After the control of the tilt, the occupant 9 pulls up the end of the control lever 44, which is closer to the rear of the vehicle, to turn the control lever 44 counterclockwise about the axis of the support shaft 45 in FIG. 2. This fixes the column tube 19 to the second bracket 32 so that the steering wheel 11 is fixed at a controlled tilt angle. In addition, the rear part 19b is fixed to the second bracket 32 (i.e., the front part 19a).

In this embodiment, a knee protection air bag assembly 51 configured to protect knees 9a of the occupant 9 is provided in addition to the upper body protection air bag assembly. This knee protection air bag assembly 51 includes an inflator 52 and a bag 53. The inflator 52 extends in the vehicle width direction. If the vehicle (particularly the front of the vehicle) collides with an obstacle, the bag 53 expands upon receipt of gas fed by the inflator 52. This expansion of the bag 53 protects the knees 9a of the occupant 9 (see FIG. 2).

The air bag assembly 51 further includes a housing 54 extending in the vehicle width direction and housing the inflator 52 and the bag 53. An opening 54a is formed in the surface of the housing 54, which is closer to the rear of the vehicle, to connect the inside and outside of the housing 54. This opening 54a has a substantially rectangular shape as viewed from the rear of the vehicle. The opening 54a is blocked by a blocking member 55 (made of paper, for example), which is easily broken by the expansion force of the bag 53. Note that the blocking member 55 may be omitted.

Figure 3:
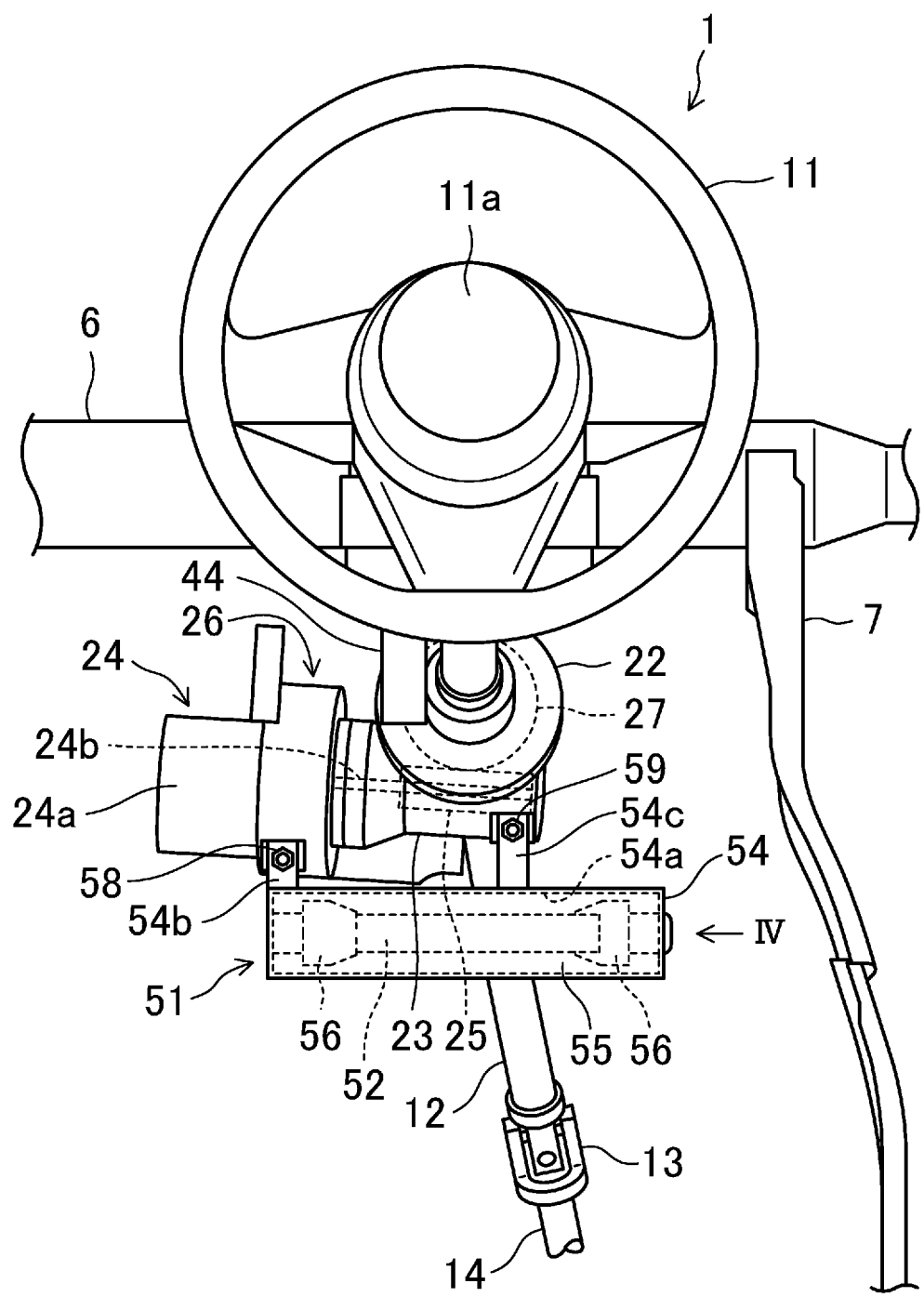
FIG. 3 corresponds to FIG. 1 without any dashboard and any meter cover.
Figure 4:
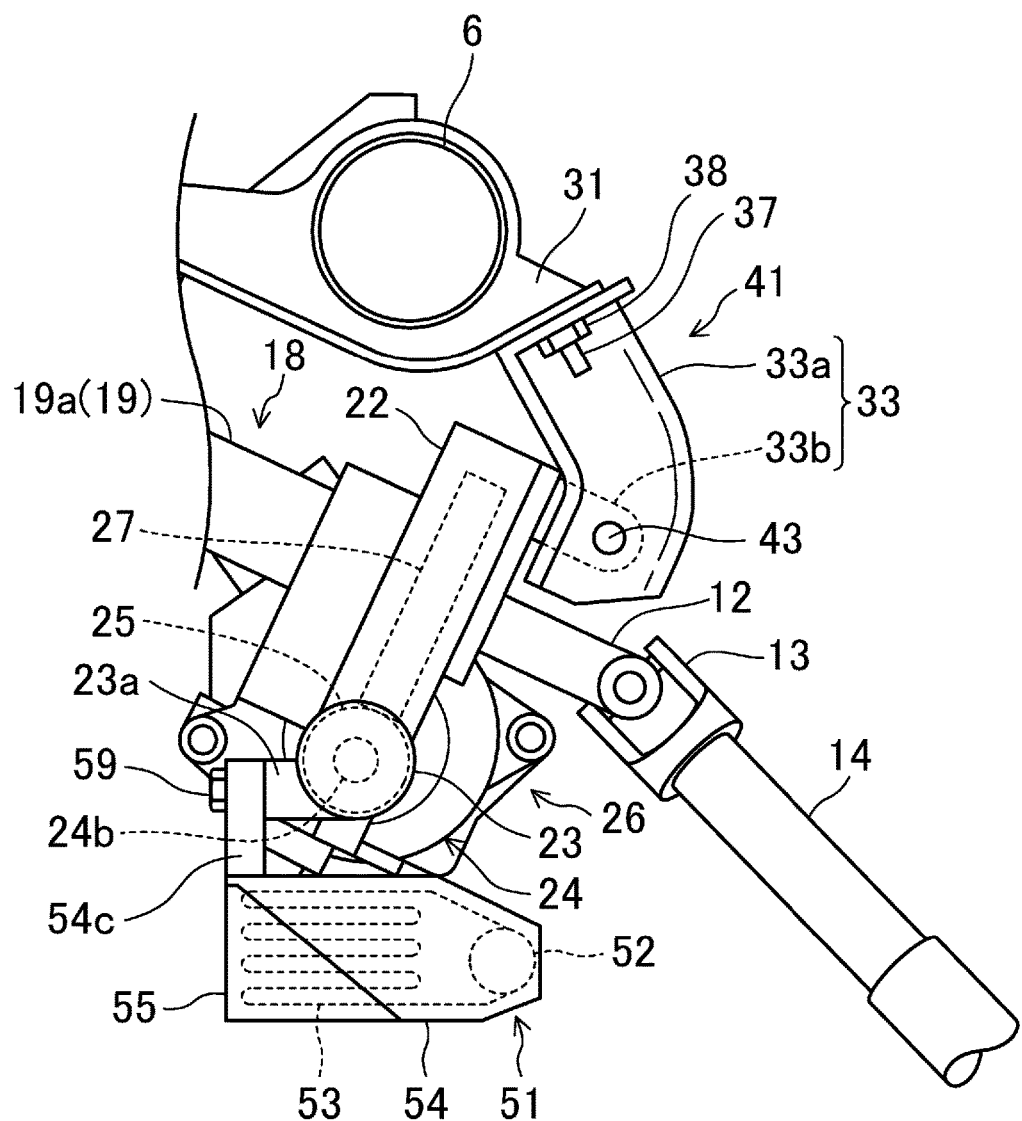
FIG. 4 is a view from the arrow IV direction.

The inflator 52 is provided in a portion of the housing 54, which is opposite to the opening 54a (i.e., closer to the front of the vehicle). The bag 53 is folded and provided in a portion of the housing 54, which is closer to the opening 54a. In this embodiment, as shown in FIG. 3, the inflator 52 is located in the housing 54 substantially symmetrically about the center of the housing 54 (in the vehicle width direction). The longitudinal ends of the inflator 52 (in the vehicle width direction) are supported by and fixed to side walls of the housing 54 in the vehicle width direction via respective support members 56.

The air bag assembly 51 is located below the drive member 26 of the electric power steering device 1. That is, the air bag assembly 51 (i.e., the housing 54) is located below the motor case 24a of the drive motor 24 and the worm housing member 23 (i.e., the worm 25).

From the upper surface of the housing 54 of the air bag assembly 51, a first attached portion 54b and a second attached portion 54c extend upward, which are spaced apart from each other in the vehicle width direction. The attached portion 54b is for attaching the air bag assembly 51 to the motor case 24a. The second attached portion 54c is for attaching the air bag assembly 51 to the worm housing member 23. The motor case 24a includes a projection 24c, which projects toward the rear of the vehicle. The tip surface of the projection 24c is a vertical surface facing the rear of the vehicle. The first attached portion 54b is fixed to the tip surface of the projection 24c by a bolt 58, while the surface of the first attached portion 54b faces the front of the vehicle abuts on the tip surface of the projection 24c. Similarly, a projection 23a projecting toward the rear of the vehicle is formed at the right end of the worm housing member 23 in the vehicle. The tip surface of the projection 23a is a vertical surface facing the rear of the vehicle. The second attached portion 54c is fixed to the tip surface of the projection 23a by a bolt 59, while the surface of second attached portion 54c facing the front of the vehicle abuts on the tip surface of the projection 23a.

In this manner, the air bag assembly 51 is attached to the drive member 26 (i.e., the drive motor 24 and the worm housing member 23), which is above and closer to the air bag assembly 51. In this attachment, the first and second attached portions 54b and 54c require no large lengths to the steering member 6, the center stay 7, and other members, which are away from the housing 54. In addition, in the attachment according to this embodiment, the air bag assembly 51 (i.e., the housing 54) can be fastened and fixed to the drive member 26 from the rear of the vehicle. This configuration easily fastens and fixes the air bag assembly 51 to the drive member 26. Usually, the steering member 6 and the electric power steering device 1 are sub-assembled with the dashboard 2. Then, the sub-assembly of the dashboard 2 is mounted in the vehicle body. Both before and after mounting the sub-assembly of the dashboard 2 in the vehicle body, the air bag assembly 51 can be easily fastened and fixed to the drive member 26.

Figure 2:
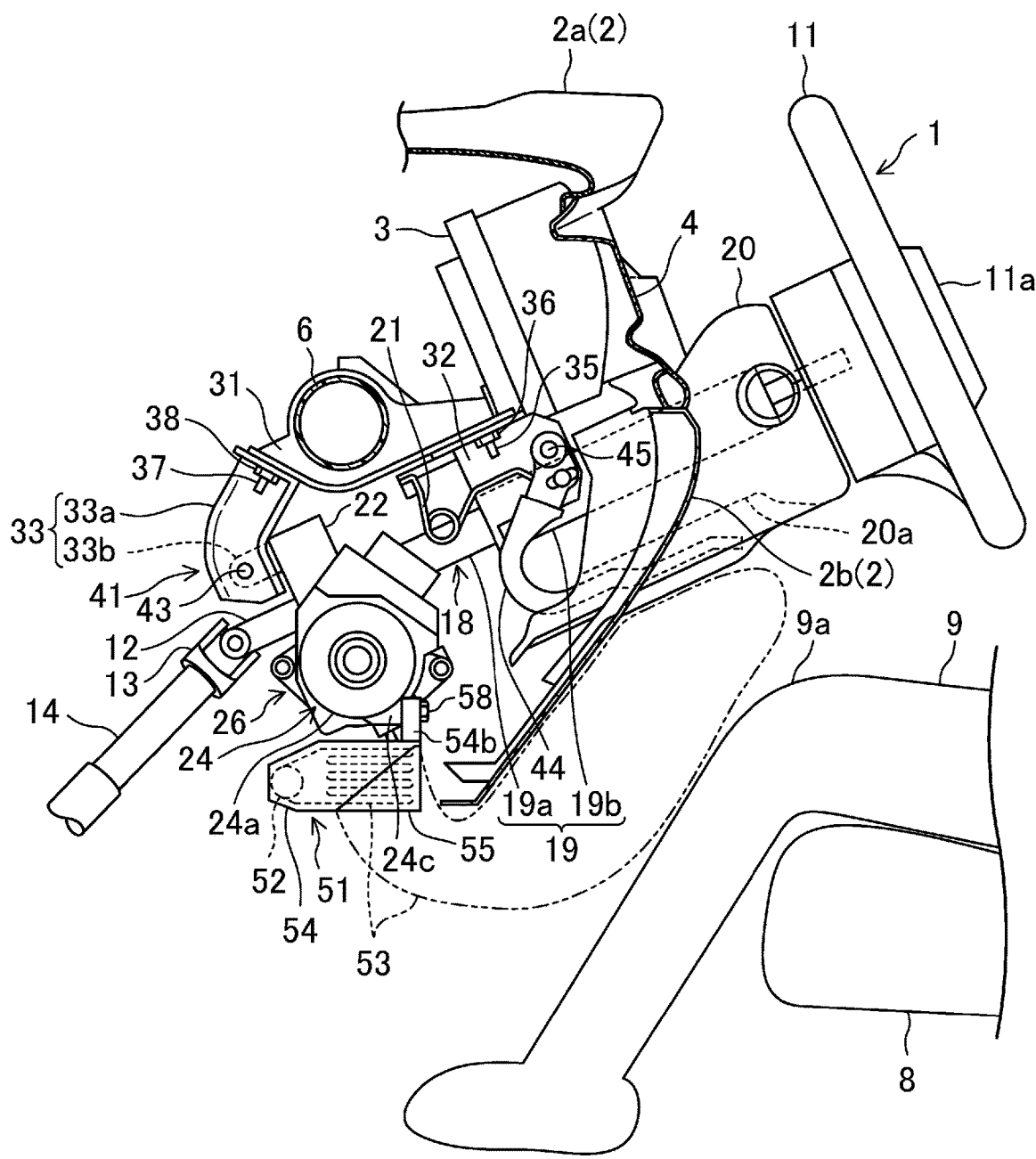
FIG. 2 is a cross-sectional view taken along the line II-II of FIG. 1.

As shown in FIG. 2, the lower panel 2b of the dashboard 2 is located closer to the rear of the vehicle than the air bag assembly 51. The air bag assembly 51 is closer to the front of the vehicle than the lower panel 2b at a predetermined or longer distance. The lower panel 2b is inclined upward toward the rear of the vehicle. The distance between the drive member 26 above the air bag assembly 51 and the lower panel 2b in the vehicle longitudinal direction is longer than the distance between the air bag assembly 51 and the lower panel 2b. In this manner, the air bag assembly 51 and the drive member 26 are provided closer to the front of the vehicle than the lower panel 2b as much as possible to keep the air bag assembly 51 and the drive member 26 away from the knees 9a of the occupant 9 as much as possible.

As shown in FIG. 2, the air bag assembly 51 is configured as follows. If the vehicle (particularly the front of the vehicle) collides with an obstacle, the bag 53 expands through the region under the lower end of the lower panel 2b beyond the lower panel 2b toward the rear of the vehicle (i.e., closer to the front of the vehicle than the knees 9a of the occupant 9). The opening 54a faces the rear of the vehicle and downward. Thus, the bag 53 heads for the rear of the vehicle downward at an initial stage of the expansion. As a result, the bag 53 hardly abuts on the lower end of the lower panel 2b. As the expansion progresses, the bag 53 heads to the rear of the vehicle and upward due to the predetermined shape from the bag 53.

After completion of the expansion, the bag 53 has a substantially J-shape as viewed in the vehicle width direction. The tip of the expanding bag 53 is located above the knees 9a of the occupant 9. In addition, after completion of the expansion, the bag 53 is substantially symmetrical about a virtual vertical surface including the axis of the steering shaft 12, and has a width (a length in the vehicle width direction) to protect the right and left knees 9a of the occupant 9.

As being located below the drive member 26, the air bag assembly 51 is also located between the second and third brackets 32 and 33 (the front and rear mount portions) in the vehicle longitudinal direction like the drive member 26. Accordingly, a weight of the drive member 26 and the air bag assembly 51 is located between the second and third brackets 32 and 33 in the vehicle longitudinal direction. The center of gravity of the whole steering column 18 is located between the second and third brackets 32 and 33 in the vehicle longitudinal direction. This results in improvement in the supportability of the drive member 26 and the air bag assembly 51, and reduction in negative effects of the weight on the vibration performance of the steering wheel 11.

In addition, the steering member (the pipe member) 6, the drive member 26, and the air bag assembly 51 are arranged vertically in parallel. With this configuration, the center of gravity of the whole steering column 18 is located under the steering member 6 (the pipe member). As a result, the supportability of the drive member 26 and the air bag assembly 51 further improves, and negative effects of the heavy load on the vibration performance of the steering wheel 11 can be further reduced.

In addition, the drive member 26 and the air bag assembly 51 are located closer to the rear of the vehicle than the turning shaft 43, which serves as a tilt spindle. As described above, the turning shaft 43 is close to and closer to the front of the vehicle than the steering member (pipe member) 6. The distance between the drive member 26 and the air bag assembly 51 and the turning shaft 43 is relatively short in the vehicle longitudinal direction. Thus, even if the steering column 18 supports a heavy load, the tilt of the steering wheel 11 can be easily controlled.

In this embodiment, the air bag assembly 51 is located below the drive member 26 of the electric power steering device 1 provided in the steering column 18. Thus, the drive member 26 and the air bag assembly 51 can be kept enough far away from the knees 9a of the occupant 9 on the driver's seat 8 in the vehicle longitudinal direction. As a result, even if the vehicle (particularly the front of the vehicle) collides with an obstacle, and the knees 9a of the occupant 9 move together with the expanding bag 53 toward the front of the vehicle, the drive member 26 and the air bag assembly 51 do not hinder the movement of the knees as much as possible.

Since the air bag assembly 51 is attached to the drive member 26, which is above and closer to the air bag assembly 51, the first and second attached portions 54b and 54c of the housing 54 (i.e., the attached portions of the air bag assembly 51) require not large lengths, which leads to a small and light air bag assembly.

In this embodiment, the steering column 18 includes the tilt mechanism 41. In the case, the vertical position of the air bag assembly 51 changes in accordance with the rocking of the steering column 18 about the turning shaft 43. Assume that the air bag assembly 51 is configured such that the bag 53 expands from an opening of the lower panel 2b of the dashboard 2. The tilt mechanism 41 changes the vertical position of the air bag assembly 51. There is a matching problem between the part of the air bag assembly 51 (the opening 54a), from which the bag 53 expands, and the opening of the lower panel 2b. However, in the air bag assembly 51 according to this embodiment, the bag 53 expands through the region under the lower end of the lower panel 2b beyond the lower panel 2b toward the rear of the vehicle. Any change in the vertical position of the air bag assembly 51 does not cause such matching problem. With this simple configuration, the bag 53 expands in front of the knees 9a of the occupant 9.

Second Embodiment

Figure 5:
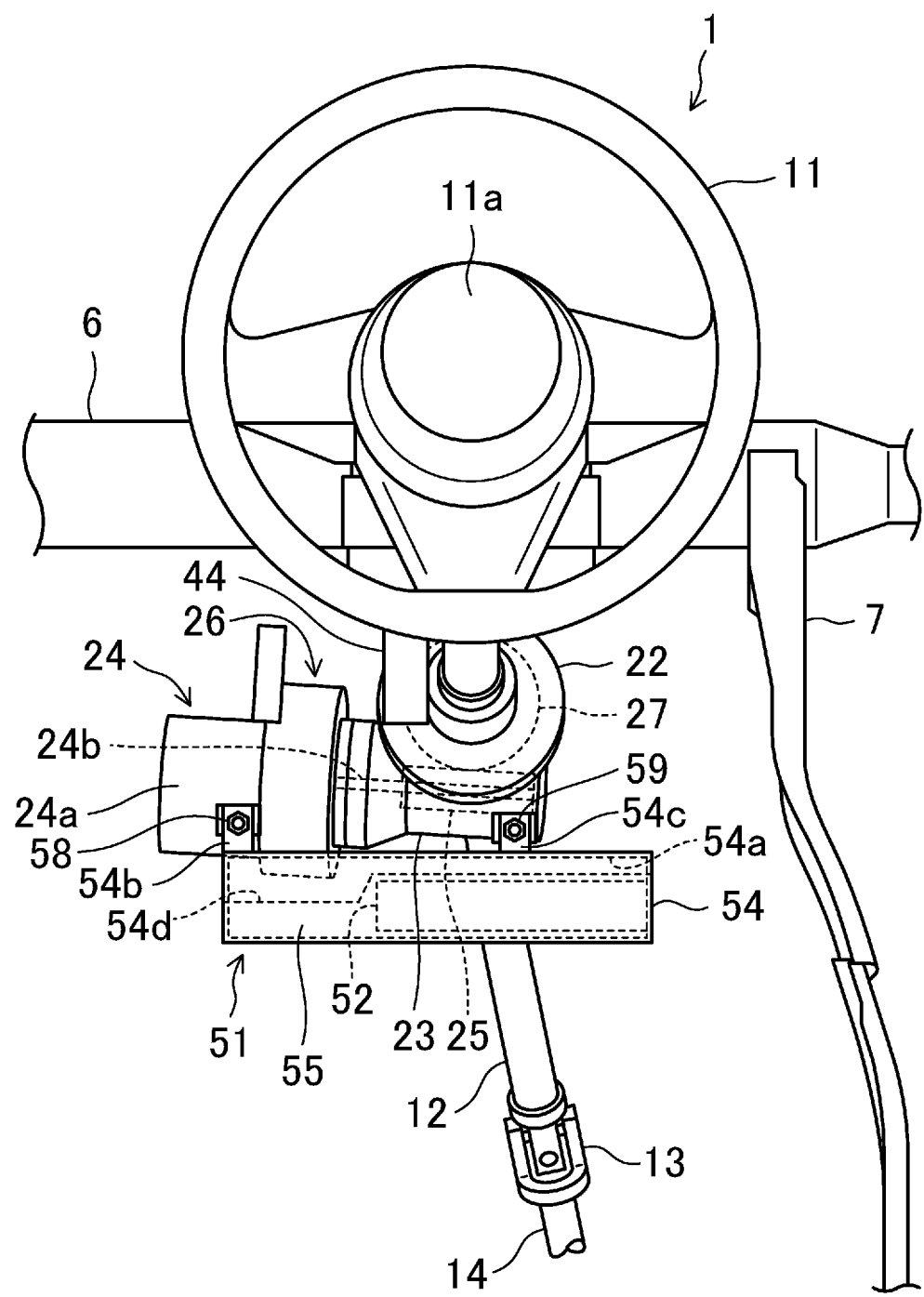
FIG. 5 illustrates a second embodiment and corresponds to FIG. 3.
Figure 6:
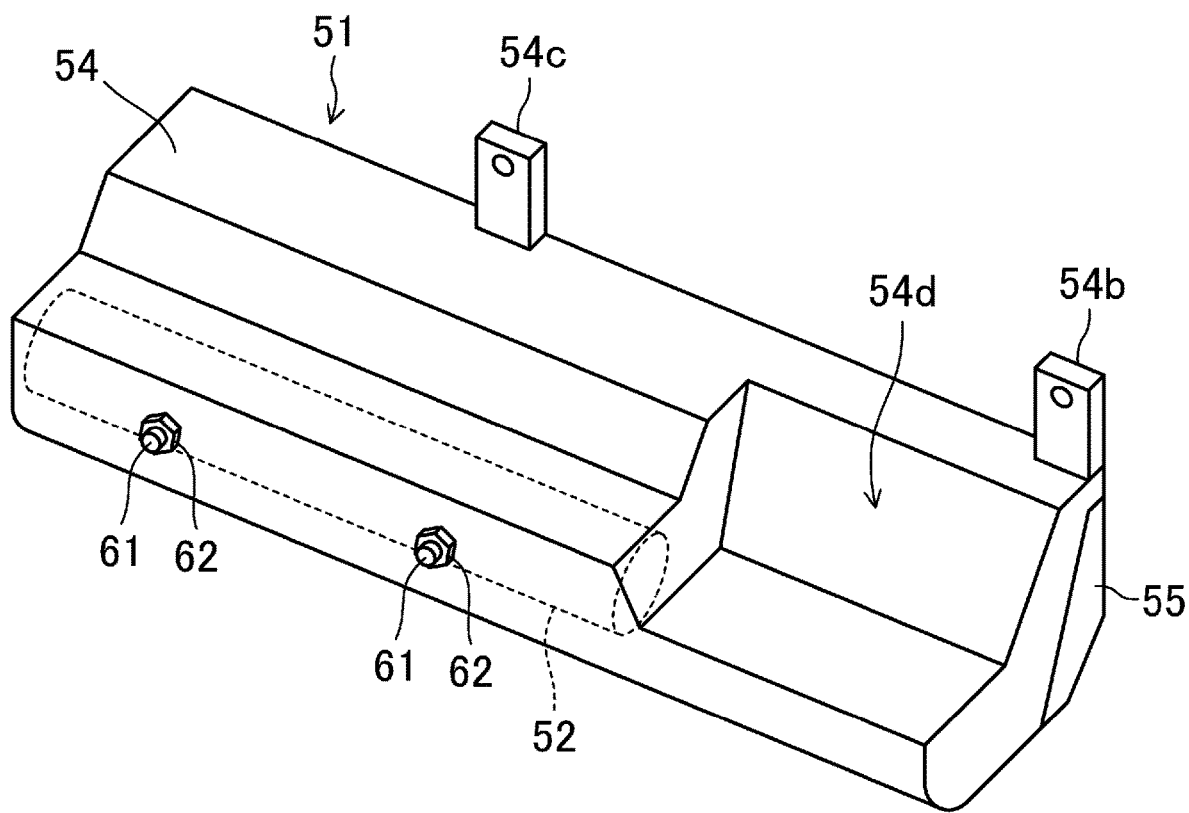
FIG. 6 is a perspective view of a knee protection air bag assembly according to the second embodiment.

FIGS. 5 and 6 illustrate a second embodiment of the present invention. In this embodiment, the configuration of the air bag assembly 51 is different from that in the first embodiment. The other configurations are basically the same or similar to those in the first embodiment.

In this embodiment, as in the first embodiment, the air bag assembly 51 (i.e., the housing 54) is located below the motor case 24a of the drive motor 24 and the worm housing member 23 (i.e., the worm 25), which are aligned with each other in the vehicle width direction. The air bag assembly 51 is attached to the motor case 24a and the worm housing member 23 via the first attached portion 54b and the second attached portion 54c, respectively.

In this embodiment, the inflator 52 of the air bag assembly 51 is provided in a portion opposite to the opening 54a of the housing 54 (i.e., in a portion closer to the front of the vehicle), on the side in the vehicle width direction, on which the worm housing member 23 is located (i.e., the worm 25). In this state, the inflator 52 is fixed to the housing 54 by a stud bolt 61 and a nut 62. The stud bolt 61 is provided closer to the front of the vehicle than the inflator 52. The nut 62 is screwed on the stud bolt 61.

As shown in FIG. 6, a recess 54d is formed in the front top of the housing 54 on the side close to the worm housing member 23 (the worm 25) (i.e., opposite to the side on which the inflator 52 is located) in the vehicle width direction. The motor case 24a is housed in the recess 54d.

The housing 54 is located at a height such that the upper surface of the housing 54 is close to the bottom of the worm housing member 23. In this case, if no recess 54d is provided, the motor case 24a with a larger diameter than the worm housing member 23 interferes with the housing 54. In this embodiment, the recess 54d reduces the interference of the motor case 24a with the housing 54.

Although FIGS. 5 and 6 do not show the bag 53, the position of the folded bag 53, and the shape and position of the expanding bag 53 are as the same as those in the first embodiment. The shape of the opening Ma of the housing 54 as viewed from the rear of the vehicle, the shape of the portion around the opening 54a as viewed in the vehicle width direction, and the blocking member 55 blocking the opening 54a are also as the same as those in the first embodiment.

This embodiment provides the same or similar advantages as the first embodiment. In addition, the air bag assembly 51 can be as close as possible to the drive member 26. As a result, the whole steering column 18 including the air bag assembly 51 requires only a short vertical length. The second embodiment further reduces the lengths of the first and second attached portions 54b and 54c (particularly, the second attached portion 54c) to improve the supportability of the air bag assembly 51.

The present invention is not limited to the embodiments described above. Any replacement may be made within the scope of the claims.

For example, in the first and second embodiments, the air bag assembly 51 is attached to the drive member 26 of the electric power steering device 1 by the first and second attached portions 54b and 54c. As long as the air bag assembly 51 is located below the drive member 26, any configuration may be employed. The air bag assembly 51 may be attached to the column tube 19 of the steering column 18, the steering member (the pipe member) 6, center stay 7, the vehicle body (particularly the dash panel) and other members instead of the drive member 26.

In the first and second embodiments, the steering column 18 includes the tilt mechanism 41. However, this tilt mechanism 41 may be omitted. In this case, the bag 53 easily expands from the opening formed in the lower panel 2b. Even if no tilt mechanism 41 is provided, the bag 53 may expand through the region under the lower end of the lower panel 2b beyond the lower panel 2b toward the rear of the vehicle, as in the embodiments described above.

The embodiments described above are mere examples, and are not to be construed as limiting the scope of the present invention. Variations and modifications of equivalents of the claims are intended to fall within the scope of the present invention.

INDUSTRIAL APPLICABILITY

The present invention is useful for the structure for mounting an occupant protection system which includes an electric power steering device including a steering column supporting a steering wheel of a vehicle, and attached to a steering member, and a knee protection air bag assembly including a bag configured to expand, if the vehicle collides with an obstacle, to protect the knees of an occupant seated on a driver's seat of the vehicle.

DESCRIPTION OF REFERENCE CHARACTERS

1 Electric Power Steering Device
2 Dashboard
2b Lower Panel
6 Steering Member
8 Driver's Seat
9 Occupant
9a Knee
11 Steering Wheel
18 Steering Column
23 Worm Housing Member
24 Drive Motor
24a Motor Case
24b Motor Shaft
25 Worm (Drive Gear)
26 Drive Member
32 Second Bracket (Rear Mount Portion)
33 Third Bracket (Front Mount Portion)
41 Tilt Mechanism
43 Turning Shaft (Tilt Spindle)
51 Knee Protection Air Bag Assembly
52 Inflator
53 Bag
54 Housing
54d Recess

The invention claimed is:

1. A structure for mounting an occupant protection system in a vehicle, the structure comprising:
   an electric power steering device including a steering column supporting a steering wheel of the vehicle, the steering column attached to a steering member; and
   a knee protection air bag assembly including a bag configured to expand if the vehicle collides with an obstacle to protect knees of an occupant seated on a driver's seat of the vehicle, wherein
   the steering column includes a drive member of the electric power steering device, the drive member being formed by a drive motor, a motor case housing the drive motor, a drive gear connected to a motor shaft of the drive motor, and a housing member housing the drive gear,
   the steering column further includes a gear housing member housing a gear meshing with the drive gear,
   the drive member is located below the steering column to extend in the vehicle width direction beyond the gear housing member,
   the knee protection air bag assembly is located below the drive member, and
   the knee protection air bag assembly is attached to the motor case and the housing member of the drive member.

2. The structure of claim 1, wherein
   the steering column includes a tilt mechanism configured to control a vertical position of the steering wheel,
   a lower panel of a dashboard of the vehicle is located closer to a rear of the vehicle than the knee protection air bag assembly, and
   the knee protection air bag assembly is configured such that the bag expands through a region under a lower end of the lower panel beyond the lower panel toward the rear of the vehicle, if the vehicle collides with the obstacle.

3. The structure of claim 2, wherein
   the motor shaft of the drive motor projects beyond a motor case in the vehicle width direction,
   the motor case of the drive motor has a larger diameter than the drive gear,
   the knee protection air bag assembly further includes an inflator extending in the vehicle width direction, and configured to feed gas to the bag, and a housing extending in the vehicle width direction, and housing the inflator and the bag, the housing is located below the motor case and the drive gear, and the inflator is formed on a side of the housing closer to the drive gear in the vehicle width direction in the housing.

4. The structure of claim 3, wherein a recess is formed in an upper portion of the housing on a side of the housing closer to the motor case in the vehicle width direction, and the motor case is housed in the recess.

5. The structure of claim 2, wherein the steering column includes a front mount portion and a rear mount portion, the front and rear mount portions are attached to the steering member, and spaced apart from each other in a vehicle longitudinal direction, and the drive member is located between the front and rear mount portions in the vehicle longitudinal direction.

6. The structure of claim 5, wherein the steering member is a pipe member extending in the vehicle width direction, the drive member is located below the pipe member, and the pipe member, the drive member, and the knee protection air bag assembly are arranged vertically in parallel.

7. The structure of claim 6, wherein the motor shaft of the drive motor projects beyond a motor case in the vehicle width direction, the motor case of the drive motor has a larger diameter than the drive gear, the knee protection air bag assembly further includes
an inflator extending in the vehicle width direction, and configured to feed gas to the bag, and
a housing extending in the vehicle width direction, and housing the inflator and the bag, the housing is located below the motor case and the drive gear, and the inflator is formed on a side of the housing closer to the drive gear in the vehicle width direction in the housing.

8. The structure of claim 5, wherein the motor shaft of the drive motor projects beyond a motor case in the vehicle width direction, the motor case of the drive motor has a larger diameter than the drive gear, the knee protection air bag assembly further includes
an inflator extending in the vehicle width direction, and configured to feed gas to the bag, and
a housing extending in the vehicle width direction, and housing the inflator and the bag, the housing is located below the motor case and the drive gear, and the inflator is formed on a side of the housing closer to the drive gear in the vehicle width direction in the housing.

9. The structure of claim 8, wherein a recess is formed in an upper portion of the housing on a side of the housing closer to the motor case in the vehicle width direction, and the motor case is housed in the recess.

10. The structure of claim 1, wherein the steering column includes a front mount portion and a rear mount portion, the front and rear mount portions are attached to the steering member, and spaced apart from each other in a vehicle longitudinal direction, and the drive member is located between the front and rear mount portions in the vehicle longitudinal direction.

11. The structure of claim 10, wherein the steering member is a pipe member extending in the vehicle width direction, the drive member is located below the pipe member, and the pipe member, the drive member, and the knee protection air bag assembly are arranged vertically in parallel.

12. The structure of claim 11, wherein the motor shaft of the drive motor projects beyond a motor case in the vehicle width direction, the motor case of the drive motor has a larger diameter than the drive gear, the knee protection air bag assembly further includes
an inflator extending in the vehicle width direction, and configured to feed gas to the bag, and
a housing extending in the vehicle width direction, and housing the inflator and the bag, the housing is located below the motor case and the drive gear, and the inflator is formed on a side of the housing closer to the drive gear in the vehicle width direction in the housing.

13. The structure of claim 10, wherein the motor shaft of the drive motor projects beyond a motor case in the vehicle width direction, the motor case of the drive motor has a larger diameter than the drive gear, the knee protection air bag assembly further includes
an inflator extending in the vehicle width direction, and configured to feed gas to the bag, and
a housing extending in the vehicle width direction, and housing the inflator and the bag, the housing is located below the motor case and the drive gear, and the inflator is formed on a side of the housing closer to the drive gear in the vehicle width direction in the housing.

14. The structure of claim 13, wherein a recess is formed in an upper portion of the housing on a side of the housing closer to the motor case in the vehicle width direction, and the motor case is housed in the recess.

15. The structure of claim 1, wherein the motor shaft of the drive motor projects beyond a motor case in the vehicle width direction, the motor case of the drive motor has a larger diameter than the drive gear, the knee protection air bag assembly further includes
an inflator extending in the vehicle width direction, and configured to feed gas to the bag, and
a housing extending in the vehicle width direction, and housing the inflator and the bag, the housing is located below the motor case and the drive gear, and the inflator is formed on a side of the housing closer to the drive gear in the vehicle width direction in the housing.

16. The structure of claim 15, wherein a recess is formed in an upper portion of the housing on a side of the housing closer to the motor case in the vehicle width direction, and the motor case is housed in the recess.

17. A structure for mounting an occupant protection system in a vehicle, the structure comprising:

an electric power steering device including a steering column supporting a steering wheel of the vehicle, the steering column attached to a steering member; and a knee protection air bag assembly including a bag configured to expand if the vehicle collides with an obstacle to protect knees of an occupant seated on a driver's seat of the vehicle, wherein the steering column includes a drive member of the electric power steering device, the drive member being formed by a drive motor, a drive gear connected to a motor shaft of the drive motor, and a housing member housing the drive gear, the knee protection air bag assembly is located below the drive member, the knee protection air bag assembly is attached to the drive member, the steering column includes a tilt mechanism configured to control a vertical position of the steering wheel, a lower panel of a dashboard of the vehicle is located closer to a rear of the vehicle than the knee protection air bag assembly, the knee protection air bag assembly is configured such that the bag expands through a region under a lower end of the lower panel beyond the lower panel toward the rear of the vehicle, if the vehicle collides with the obstacle, the steering column includes a front mount portion and a rear mount portion, the front and rear mount portions are attached to the steering member, and spaced apart from each other in a vehicle longitudinal direction, the drive member is located between the front and rear mount portions in the vehicle longitudinal direction, the steering member is a pipe member extending in the vehicle width direction, the drive member is located below the pipe member, the pipe member, the drive member, and the knee protection air bag assembly are arranged vertically in parallel, the motor shaft of the drive motor projects beyond a motor case in the vehicle width direction, the motor case of the drive motor has a larger diameter than the drive gear, the knee protection air bag assembly further includes
an inflator extending in the vehicle width direction, and configured to feed gas to the bag, and
a housing extending in the vehicle width direction, and housing the inflator and the bag, the housing is located below the motor case and the drive gear, the inflator is formed on a side of the housing closer to the drive gear in the vehicle width direction in the housing, a recess is formed in an upper portion of the housing on a side of the housing closer to the motor case in the vehicle width direction, and the motor case is housed in the recess.

* * * * *